United States Patent [19]
Bender et al.

[11] Patent Number: 6,038,033
[45] Date of Patent: Mar. 14, 2000

[54] METHOD AND APPARATUS FOR COMPRESSING AND DECOMPRESSING PRINT DATA IN THE BACKGROUND OPERATIONS OF A PRINTER

[75] Inventors: Michael Donald Bender, Lexington, Ky.; Christopher Mark Songer, Foster City, Calif.

[73] Assignee: Lexmark International, Inc., Lexington, Ky.

[21] Appl. No.: 08/915,183

[22] Filed: Aug. 20, 1997

[51] Int. Cl.[7] .............................. B41B 15/00; H04N 1/40; H04N 1/00

[52] U.S. Cl. ...................... 358/1.16; 358/1.16; 358/1.17; 358/1.15; 358/1.1; 358/1.13; 358/444; 358/448; 358/404

[58] Field of Search ..................................... 395/115, 116, 395/114, 101, 112, 110, 102; 358/444, 448, 404, 401, 296, 400, 1.16, 1.17, 1.15, 1.1, 1.13, 1.11, 1.2; 364/900

[56] References Cited

U.S. PATENT DOCUMENTS

| | | | |
|---|---|---|---|
| Re. 33,316 | 8/1990 | Katsuta et al. | 364/521 |
| 4,764,975 | 8/1988 | Inoue | 382/47 |
| 4,931,984 | 6/1990 | Ny | 364/900 |
| 5,146,547 | 9/1992 | Beck et al. | 395/116 |
| 5,461,682 | 10/1995 | Nomura | 382/232 |
| 5,479,587 | 12/1995 | Campbell et al. | 395/116 |
| 5,483,354 | 1/1996 | Kessels et al. | 358/444 |
| 5,533,175 | 7/1996 | Lung et al. | 395/115 |
| 5,602,976 | 2/1997 | Cooper et al. | 395/116 |
| 5,764,869 | 6/1998 | Bagley et al. | 395/115 |

*Primary Examiner*—Edward L. Coles
*Assistant Examiner*—Twyler Lamb
*Attorney, Agent, or Firm*—Jacqueline M. Daspit; Frederick H. Gribbell

[57] ABSTRACT

An improved printer is provided which includes a separate hardware compression module and hardware decompression module contained within the ASIC of the print engine. A "Request Counter" register is decremented each time memory is requested to store a block of bitmap image data. When the Request Counter decreases to a predetermined value, the current size of the remaining "free memory" space is evaluated. If this free memory is less than another predetermined value (a "low water mark"), then blocks of data that have already been stored in the printer's memory are sent to the compression module to be compressed before the printer literally runs out of free memory, and the printer can continue storing and processing more incoming print job data. By thus preserving some of the free memory, the printer can continue to process or rasterize more print data while the compression hardware simultaneously operates independently to compress one or more blocks of data. Since the compressor hardware operate independently of the printer's microprocessor, the printer can continue to process further data during the actual compression operations, thereby preventing the printer's microprocessor from becoming idle, which otherwise would become a very inefficient utilization of the printer's processing power. The present invention is especially useful in processing color data, especially in printers containing relatively small quantities of RAM, since color data typically requires four (4) planes of bitmap image data per page to be printed.

30 Claims, 8 Drawing Sheets

METHOD AND APPARATUS FOR COMPRESSING AND DECOMPRESSING PRINT DATA IN THE BACKGROUND OPERATIONS OF A PRINTER

TECHNICAL FIELD

The present invention related generally to printing equipment and is particularly directed to a laser printer of the type which compresses print data to save memory space in the printer's main RAM. The invention is specifically disclosed as a method for compressing and decompressing print data in a background operation while the printer simultaneously performs one of its other main functions of rasterizing print data.

BACKGROUND OF THE INVENTION

In many conventional printers, a "page" of print data is typically divided up into multiple "blocks" which, in turn, each contain many rows and columns of print data in the form of dots or print elements (i.e., "pels"). Such print data is typically received by a printer from a host computer in the form of a high-level page description language, which must be processed or "rasterized" to convert the page description language commands into the multitude of dots that make up the final print image. Many printers perform an intermediate conversion step in which the high-level page description language commands are partially converted into a series of commands and data that can be quickly rasterized into a final bitmap image that can be sent directly to the print engine.

In most modern conventional printers, each of the blocks for a page are treated on an individual basis, so that the bitmap image data that represents one of these blocks can be stored in the printer's memory at a separate set of memory locations quite apart from similar image data representing another one of the individual blocks. This separate storing of data is typically necessary so that the printer's microprocessor can attempt to perform multiple relatively short tasks virtually simultaneously while also handling the incoming print data being received from a host computer, recognizing the fact that the microprocessor is still a sequential operating device and must handle the rasterizing and storing of bitmap image data one data word at a time, which makes is necessary to divide a page of print image data into smaller sections (i.e., the blocks) to make it more possible to divide the microprocessor's processing time into individual discrete tasks, while also utilizing only a portion of the printer's random access memory (RAM) at one time to store some of this image data.

When a block of image data is stored in RAM, it will require as many RAM bits as there are potential dot locations in the matrix of rows and columns of that block. If the printer is a color printer, then each block will typically have four (4) planes of data to handle the four (4) different colors that will ultimately be printed for that block. If, for example, each block is 128 lines×512 columns in size, then its bitmap will require 65,536 bits of RAM for storage, which translates into 8 Kbytes of memory space. If the printer handles color data, then the memory requirements for that block of data will be four (4) times that memory size, or 32K. At a print resolution of 600 dots per inch (dpi), a single page of 8½×11 inches would require about 500 blocks having the dimensions 128×512, which represents a total memory size of over 4.2 Mbytes of RAM to store this single page of data, assuming black and white dots for a monochrome printer. For a color page, this print resolution would require over 16 Mbytes of RAM.

Since typical laser printers come with a standard memory in the range of one to two (1–2) Mbytes of RAM, it is easy to see that it is impossible to store even a single complete page of bitmap image data (at any time) within the memory system of the printer. Therefore, the blocks of the page that make up each of the horizontal strips across the page are typically processed and printed as an individual set of data. In many conventional printers, there are specific places reserved in the printer's memory system to hold a complete strip (or "swath") of bitmap image data (sometimes referred to as a "band buffer"), so that this data can be processed and then printed, while another like strip or swath of bitmap image data is being processed while also being stored in memory. This second strip or swath of bitmap image data will typically also have a specific place reserved in the printer's memory system, and these especially reserved places in the printer's RAM are typically made up of contiguous memory locations that can have their data easily passed to the print engine when needed.

In conventional laser printers, blocks of image data are rasterized and stored in the printer's memory system without any compression of the data taking place until the printer realizes that it now has insufficient remaining free memory to store any further blocks of bitmap image data. If the printer can physically print the data quickly enough, then it is possible for an entire page of data to be rasterized and printed without running out of free memory, however, this will typically occur only in the most simple of documents having very few dots to be placed on the print media. The more general case is where the printer has rasterized a few blocks of image data and has stored it in the printer's RAM, and then realizes that no further blocks can be stored in the printer's RAM until either (1) some of the existing blocks have been printed, thereby freeing up that portion of the RAM, or (2) by compressing the data representing blocks that have already been stored in RAM, thereby also freeing up a portion of the memory space that previously was "busy."

When a conventional printer compresses data, it uses either software or hardware techniques. In the case where the compression is performed by a software routine, the printer's microprocessor retrieves one of the blocks of data already stored in RAM, in which this block of data presently exists as a full bitmap image in an uncompressed state, and the microprocessor will compress that data using a data compression technique (of which there can be more than one), and then stores the compressed result into another portion of RAM which should be much smaller in size than the portion of RAM from which the uncompressed block was retrieved.

If the data compression is performed by hardware, the printer's microprocessor chooses which block of data already stored in RAM will be the next block to be compressed, and will either retrieve that bitmap image block from RAM and transmit it to a hardware compression module using the processor's data and address busses (and thereby take up some memory bandwidth in doing so), or will command a Direct Memory Access (DMA) controller to retrieve the data from RAM and send it to the hardware compression module. Once that occurs, in conventional printers the microprocessor becomes idle, waiting for the compression cycle to become complete so it can store the compressed block of data before processing or rasterizing any further data. This is an inefficient utilization of the processing power of the printer's microprocessor.

An example of a printer that uses a hardware compression and decompression technique is disclosed in U.S. Pat. No.

5,483,354 (by Kessels) which discloses an image forming device that can create two-sided copies by rotating the second image through 180 degrees. This invention efficiently utilizes memory space by storing image data that does not need to be rotated in the first free memory address from front to back, and image data that must be rotated is stored in the last free memory address from back to front. A microprocessor or other computerized unit controls the operations of the buffers and memory storage devices, and there is a separate "compression device" and "decompression device." The incoming image data is first compressed before being either buffered or stored in memory, and after being retrieved from memory is decompressed before being printed.

Examples of printers that compress data using software techniques are disclosed in U.S. Pat. No. 5,479,587 (by Campbell) and U.S. Pat. No. 5,602,976 (by Cooper). Campbell discloses a printer that compresses data so as to use minimum RAM for holding a page of data. This printer contains a plurality of data compression procedures within its ROM. Three of the data compression techniques are "mode-m", "lzw", and a "lossy" compression procedure. The printer to attempts to allocate RAM for portions of the input data flow, and determines whether or not a sufficient amount of RAM is available for each allocation. A first data compression technique is performed, then tested to see if an appropriate level of compression has been achieved (by testing to see if it exceeds a predetermined threshold). If not, succeeding data compression procedures are employed and tested after each procedure is made, against the threshold. One of the objects of Campbell it to provide a page printer using data compression which is used when the on-board memory is in a state where printing cannot continue unless data compression occurs, and does so by software routines that control its microprocessor to carry out the actual compression and decompression techniques, using routines stored in ROM that contain the various types of available compression/decompression techniques. The disclosed data compression techniques are used in a sequence that is based upon the beneficial characteristics of each technique (i.e., the fastest technique is tried first), and also the choice of which data compression technique is to be used also depends upon the success or lack of success of a previously-tried technique. Image data is thereby compressed only when necessary, and then via the best suited technique.

U.S. Pat. No. 5,602,976 (by Cooper) discloses a page printer that converts input data in a page description language format into an intermediate display list format. The page is divided into strips that can be either entirely rasterized and compressed using a lossless or lossy compression technique, or it may be determined that the strip can be rasterized on the fly. Each strip is inspected and a time estimate is created by the processor and stored, so as to be certain that each strip will be rasterized quickly enough to keep up with the print engine. If the display list commands do not overflow memory during input, the complete strips are rasterized and compressed in the order in which they will be printed. If memory overflows at any point in the process, then the rasterizing times for the remaining strips may be determined or estimated and stored, without storing the raster output (in other words, the strips remain in their display list command format for the time being).

It would be advantageous for a printer to be able to operate more efficiently by eliminating the idle time of its microprocessor while waiting for a hardware compression module to perform a data compression cycle, and further to eliminate the need to compress print data by software techniques.

SUMMARY OF THE INVENTION

Accordingly, it is a primary object of the present invention to provide a printer which can compress and decompress data in the "background" of the microprocessor's other functions, such as the processing or rasterizing of print data.

It is another object of the present invention to provide a printer that begins compressing data before entirely running out of enough free memory space so that the printer may continue to rasterize incoming print data while the previously received print data is being compressed.

It is a further object of the present invention to provide a printer that both operates more efficiently and with less memory by operating in parallel by continuing to process new print data while compressing and decompressing print data by initiating compression operations before the amount of free memory becomes so minimal that the printer cannot continue processing or rasterizing incoming print data, and providing a hardware compression module that operates independently of the printer's microprocessor.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printer is provided which includes a separate hardware compression module and hardware decompression module contained within an ASIC of the printer. This improved printer includes a "Request Counter" register which is decremented (e.g., decreased in value) each time memory is allocated to store a block of uncompressed bitmap image data. When the Request Counter decreases to a predetermined value, the current size of the remaining "free memory" space is evaluated. If this free memory is less than a second predetermined value (a "low water mark"), then blocks of data that have already been stored in the printer's memory are sent to the compression module to be compressed before the printer literally runs out of free memory, and the printer can continue storing and processing more incoming print job data. By thus preserving some of the free memory, the printer can continue to process or rasterize more print data while the compression hardware operates independently to simultaneously compress one or more blocks of data.

This simultaneous compression step allows the amount of memory storage space required from the printer's RAM for holding rasterized bitmap data to be reduced (as compared to storing uncompressed bitmap data), and by operating independently of the printer's microprocessor, the printer can continue to process further data during the actual compression operations, thereby preventing the printer's microprocessor from becoming idle, which otherwise would become a very inefficient utilization of the printer's processing power. The printer of the present invention is especially useful in processing color data, especially in printers containing relatively small quantities of RAM, since color data typically requires four (4) planes of bitmap image data per page to be printed.

If the Request Counter has not fallen to the threshold level, then not only is the counter decremented, but the block of image data is stored in its uncompressed state. Later, when that block of image data is retrieved to be sent to the print engine (i.e., assuming the block remained uncompressed to this point), then the memory is freed and the Request Counter is incremented (e.g., increased in value).

The printer of the present invention does not merely compress any block of bitmap image data that has been stored in the printer's RAM, but determines a priority for each block of data that can be made available to the compression hardware module. The order of preference in choosing blocks to be compressed is to first choose blocks on the page about to be printed, then blocks in which the processing or rasterizing is already completely "done," and finally, blocks on a page that is actively being processed. This last choice is the least desirable, and should not be used unless entirely necessary to allow the printer to continue to operate.

The printer of the present invention also has a priority of blocks to be decompressed, as follows: the first priority is a block that is presently needed so that it can be printed. The second priority is a block needed by the interpreter to perform further processing on that block.

When the printer of the present invention receives a system MALLOC (i.e., Memory Allocation Request), the microprocessor checks the status of the Request Counter and if the counter has fallen all the way to zero (0), then the printer will decide whether it should compress some of the print data currently residing in the printer. This is accomplished by inspecting the actual free memory size, which is then compared to a "low water mark" (i.e., a "low threshold value"). If the free size is below the low water mark, a "Queue Blocks for Compression" routine is executed, which finds uncompressed blocks and performs an initial compression operation on such blocks. Each block is tested to see if it achieved a predetermined minimum compression ratio, and if so the block is "marked" as "compressed" so long as the block has not been accessed by the interpreter. Once the block is marked as compressed, the block is stored and the memory locations that held the previously uncompressed block for the same data become freed for further use by the memory system. If the initial compression of the block did not achieve a minimum compression ratio, then the block is marked as being "difficult" to compress, and the compressed version of this block is not stored in memory.

When the system runs the Queue Blocks for Compression routine, it prioritizes the blocks that may be submitted for compression. The blocks having the highest priority are located on the "oldest" page that is not fully compressed and also that is not currently being printed. Once this particular page has been selected, each of the blocks of each of the color planes of the page are then prioritized, that the more acceptable blocks are added to the compression queue and will eventually be handed off to the hardware compression module. Once this page is fully compressed, and if further memory still needs to be freed, the Queue Blocks for Compression routine will continue to be run for another page.

If necessary, blocks will be compressed from the "active page," which is the page now being processed (i.e., rasterized). This active page is a less desirable page for having its blocks compressed, because the interpreter may still be looking to perform operations on some of these blocks. The present invention performs tests to see if the block is in the current "working region" of the page, and will not select blocks from that area. This is not a guarantee that a block that becomes compressed at this time will not later be required by the interpreter, however, it is a safeguard to eliminate for consideration the compression of blocks that are definitely being looked at by the interpreter. This will prevent selecting blocks that could otherwise become repeatedly compressed and decompressed, also known as "thrashing."

Finally, the present invention always ensures that a minimum number of blocks will be left uncompressed for each color plane. This minimum number is generally equal to the number of blocks it takes to fill the width of a page (i.e., to complete a strip (or swath) across the page), however, this minimum number of blocks can be fine-tuned for a particular printer.

If the free memory is nevertheless exhausted even though the hardware compression is running in the background of the printer of the present invention, then the printer will temporarily revert to the "straightforward method" of compressing any available block until just enough memory is available to complete the current operation by the printer. This should only occur when an extremely complex page is being printed in low memory, or when the processing of pages is far ahead of the print engine.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
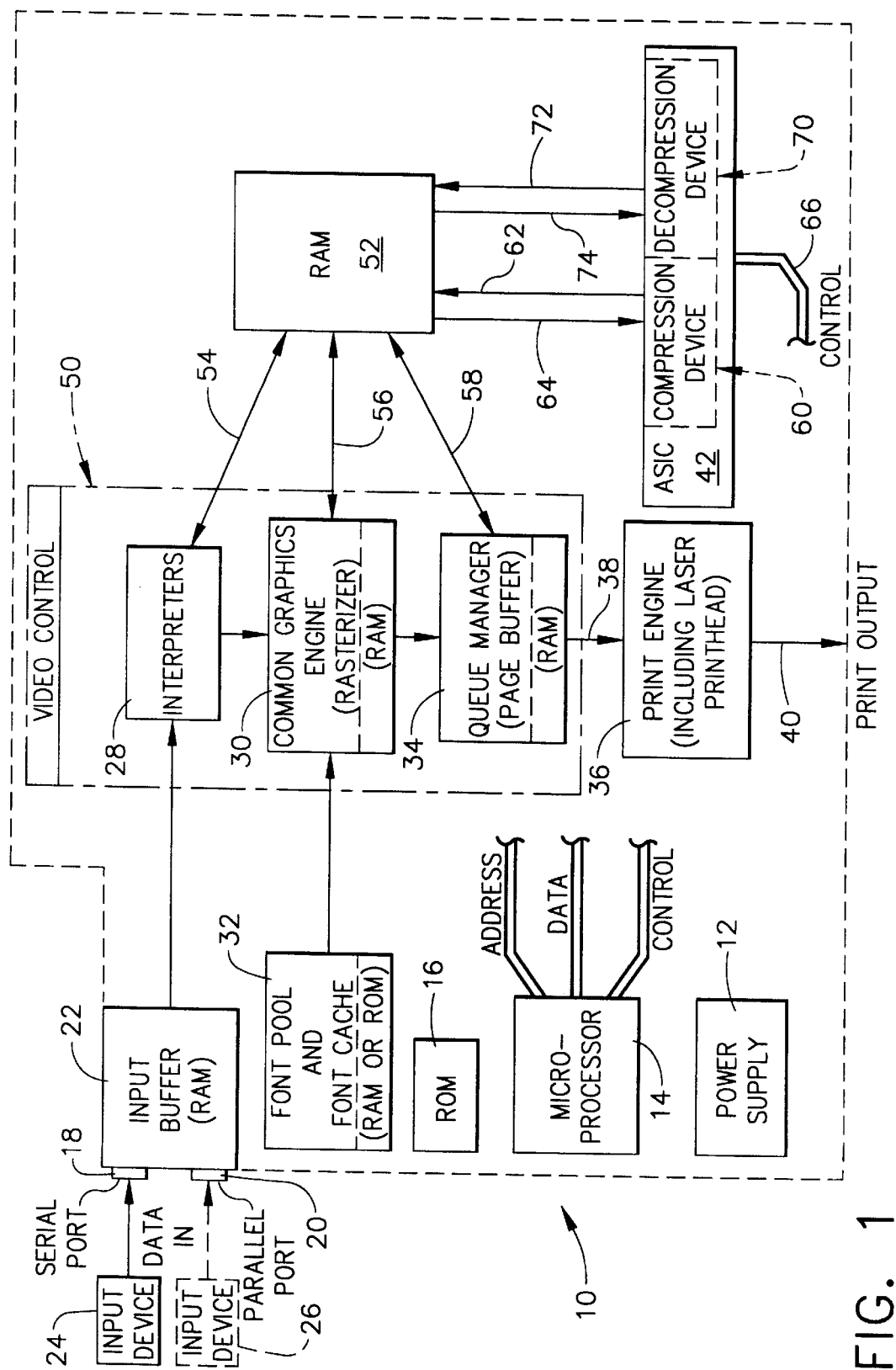
FIG. 1 is a diagrammatic view of a printing system having a hardware module that contains a compression device and a decompression device, as constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), some of which is divided by software operations into several portions for performing several different functions, and some of which is used to store both compressed and uncompressed print data, at the reference numeral 52.

Laser printer 10 also contains at least one serial input or parallel input port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM designated by the reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36.

The functions performed by the interpreters 28, graphics engine 30, and queue manager 34 combine to act as a "video control," designated by the reference numeral 50. The output 38 is a parallel data signal that is received by print engine 36, which will later be converted to a serial data signal. Print engine 36 includes a laser light source (not shown) within a printhead, and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

Print engine 36 contains an ASIC (Application Specific Integrated Circuit) which acts as a controller and data manipulating device for the various hardware components within the print engine. The bitmap print data arriving from Queue Manager 34 is received by the print engine's ASIC, and at the proper moments is sent in a serialized format to the laser printhead.

Another ASIC designated by the reference numeral 42 contains a hardware compression device 60 and a hardware decompression device 70. Both compression device 60 and decompression device 70 are capable of operating on a "stand alone" basis without any intervention from the microprocessor 14, or from any other controlling device within the print engine 36, although microprocessor 14 controls the starting and stopping of these compression and decompression devices via the control bus 66. Once print data representing a block has been retrieved from RAM 52 along data path 64, then compression device 60 can perform the compression on the block of data presently contained therewithin, and when the compression cycle is complete, microprocessor 14 will be informed via the control bus 66 that the compressed data for this block has been placed back in RAM 52 via a DMA operation along data path 62.

The same type of operating mode is used with the decompression device 70, in which print data is transferred from RAM 52 to the decompression device 70 via signal path 74, and decompressed data is passed back to RAM 52 via data path 72.

As depicted on FIG. 1, RAM 52 not only interfaces with compression device 60 and decompression device 70, but also interfaces with the interpreters 28, the common graphics engine 30, and the queue manager 34, along signal paths 54, 56, and 58, respectively. As will be seen hereinbelow, the print data being interfaced to or from the compression device 60 and decompression device 70 can be derived from any one of the main operational devices of the video control block 50, including the interpreters, rasterizer, and page buffer (part of the queue manager 34).

The laser printing process requires that all pels for an entire page be fed to the print engine in real time as the page is being printed. To feed data to the laser printhead in the time required, a complete representation of the printed page is typically stored in memory prior to printing, and the most obvious way to store this data is in the form of a bitmap image. Each memory bit in the bitmap represents a pel position on the page that could be printed. The large amount of memory required to hold an entire bitmap image of a page is quite expensive (using, e.g. dynamic RAM), so this bitmap data is typically compressed to significantly reduce the amount of memory required to store the entire page. The compression and decompression of data is often too slow to be done by a general purpose microprocessor under software control, so many conventional laser printers include a hardware compression and decompression device to speed the process. However, in conventional printers (as related above), once a "block" of print data is passed to the compression device, the microprocessor in the printer remains essentially idle until the compression of that block of print data becomes complete. Once that occurs, the compressed data for that block can be stored in RAM, and the microprocessor can resume performing other tasks, including the processing or rasterizing of incoming print data.

Moreover, conventional printers typically process block after block of data, while attempting to rasterize the entire page, until the memory system of the printer becomes full, in which the "free" memory of the printer's RAM becomes near-zero to the point where it cannot store any additional blocks of data. When the memory becomes this full, the microprocessor begins performing the compression of the blocks, either in software, or by use of separate hardware compression and decompression devices, as related above. This compression on demand (i.e., when the free memory space becomes near-zero) is also known as the "straightforward control approach," and in this circumstance the memory holding the blocks of print data quickly becomes fragmented. When this occurs, areas of free memory are interspersed with areas of "used" memory, such that the largest contiguous area of free memory is not large enough to do any useful work. Once memory is fragmented, the software controlling the printer's microprocessor must frequently move blocks of data around in memory (known as a defragmentation process) so that a large enough contiguous area of memory becomes available to perform useful work.

One of the advantages of the present invention is that the microprocessor can be performing useful functions, such as processing more incoming print data, while at the same time the hardware decompression and compression modules are operating. This greatly increases the efficiency of the compression operation, thereby freeing the microprocessor to spend more time in sending image data blocks to the compressor 60, so as to be able to choose only those blocks that achieve the minimum compression ratio for storing in RAM 52. This effectively reduces the amount of memory fragmentation that will occur in the printer's memory system (which consequently reduces the amount of defragmentation work that must be performed by the microprocessor). This provides an improved overall system performance in a processing system that has a limited amount of memory.

The bitmap for each page to be printed is divided into arbitrary sized regions called "blocks," and these blocks are typically the same size for an entire page. Such blocks are typically made to correspond to a rectangular physical area on the printed page, and it is assumed that every bitmap is divided into more than one block, and that the block size is relatively small compared to the entire bitmap for a page.

In color printers, each printed page will typically require four (4) separate bitmaps to be generated, using a standard four-color process (using cyan, magenta, yellow, and black inks). Therefore, each of the pages will have four planes that are each divided into blocks that are the same size for the entire page. Such blocks are seen on FIG. 2 at the reference numerals 132, 134, and 136 on the "yellow" plane 128 for the left-most page 120 (as viewed on FIG. 2), and also the blocks 162, 164, and 166 for the yellow plane 158 of the right-most page 150. On FIG. 2, the processing of several pages of print data is generally designated by the reference numeral 100, which depicts a few pages presently being operated on by the printer 10 of the present invention. The left-most page 106 (i.e., "Page 1") currently is also the "last page" 102, which means it is the "oldest" page of this overall print job presently contained in the printer 10, and also represents the page that is currently being printed. This last page 106 consists of the four planes 122, 124, 126, and 128, thereby making up the entire page representation 120. As will be discussed in greater detail below, the present invention can compress blocks of print data that belong to this last page 120, and typically any blocks to be compressed from the last page 120 will preferably come from the last color plane that is to be printed (such as the yellow plane 128). Of course, if further blocks of data need to be compressed, then under certain conditions it is possible for blocks from another plane of this page (such as the cyan plane 126) to be compressed.

Figure 2:
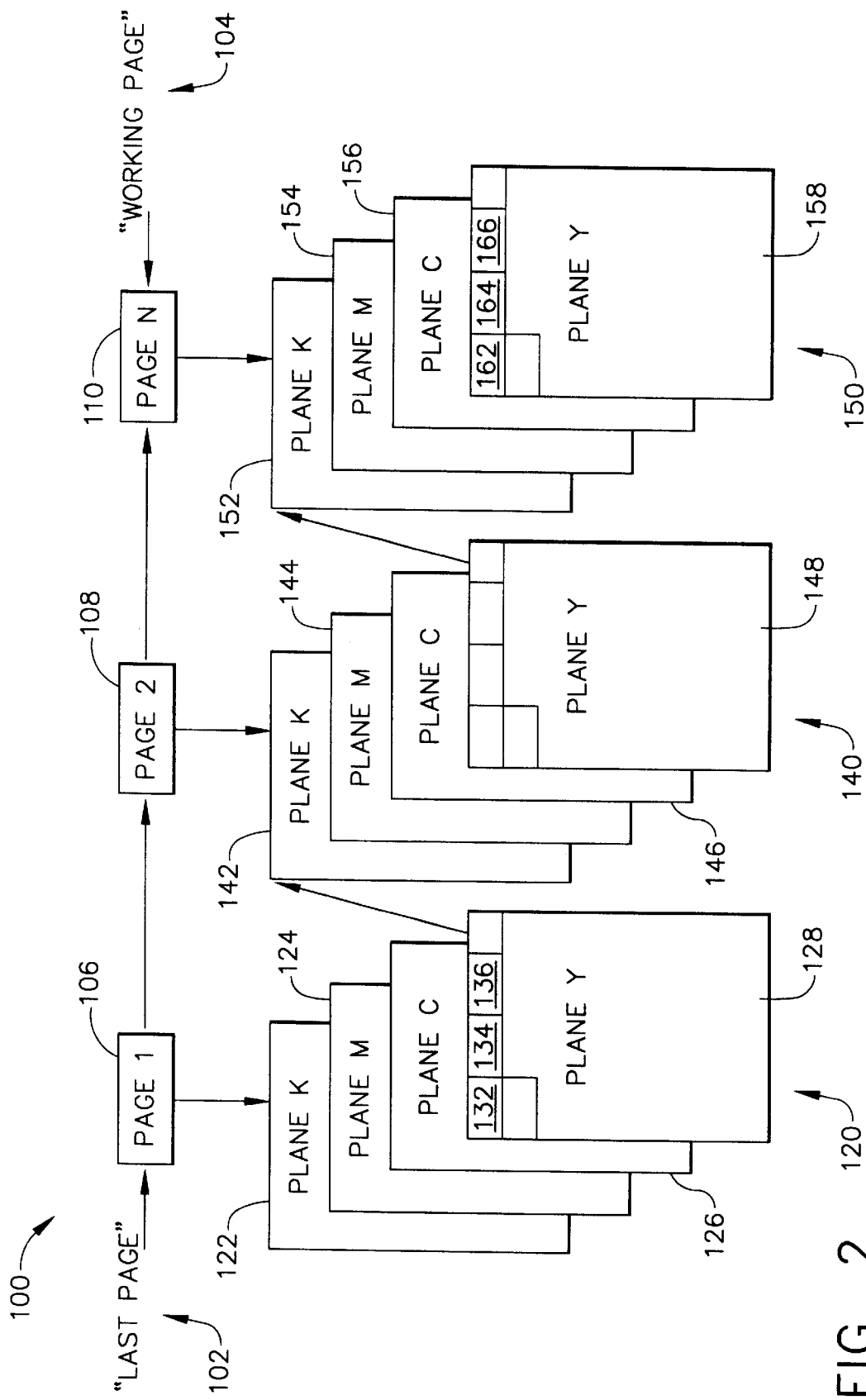
FIG. 2 is a combination block diagram and diagrammatic view of several planes of bitmap image data representations at various stages of processing and printing in the printer of FIG. 1.

The upper portions of FIG. 2 show a "Page 1" 106, a "Page 2" 108, and a "Page N" 110. While moving from left-to-right through these pages, the diagram of FIG. 2 is moving from the page now being printed toward a page currently being actively processed (or rasterized), which is why the Page N 110 is also called the "Working Page" 104. Page 2 (at 108), being a color image page, also contains four color planes at reference numerals 142, 144, 146, and 148, and generally designated overall by the reference numeral 140. This represents a page that has already been processed and, therefore, is "Done." Page N also has four color planes at numerals 152, 154, 156, and 158, and is generally designated overall by the reference numeral 150. This rightmost page 150 represents the Working Page 104, which is actively being processed. The present invention has logic rules as to which blocks of which pages will be compressed or decompressed, as will be discussed in detail hereinbelow.

Figure 3:
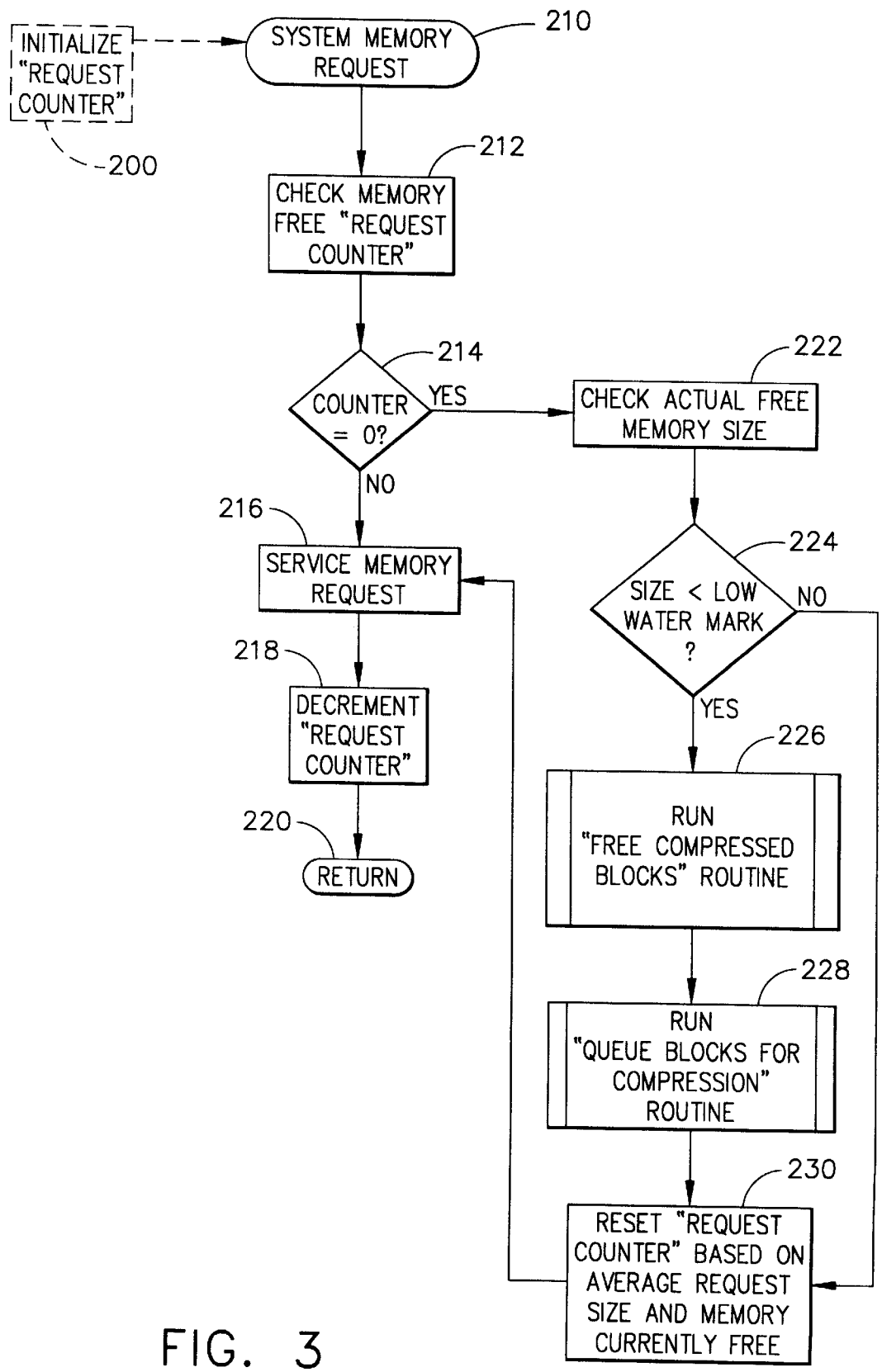
FIG. 3 is a flow chart of the high-level logic operational steps that take place in the printer of FIG. 1 to perform a "Speculative Compression Process" as used in the printer of FIG. 1.

FIG. 3 is a flow chart of some of the high-level routines performed by the printer of the present invention, and referred to as a "Speculative Compression Process." A "Request Counter" is provided as one of the registers either in the printer's main memory system (i.e., its RAM), or in a register within its microprocessor 14. This Request Counter must be initialized to a numeric value, which occurs at a function block designated by the reference numeral 200. This Request Counter is used to reduce the number of times the actual available free memory size must be checked, since checking the amount of memory available requires accessing several structures, and consequently takes time.

The initial value of the Request Counter is set based upon the largest available block of free memory in the system, and the average expected size of requested memory. It will be understood that, once the printer is fully initialized, the vast majority of memory requests will be to store a block of image data. The numeric value of the counter is adjusted to predict the number of memory requests that will occur before the free memory size is at a point where the compression of blocks should begin. This procedure eliminates the need to check the actual "free" memory available each time memory is requested (i.e., to store a block of print data that has been received at the printer). The Request Counter decrements each time memory is requested, and the actual free memory size is only tested when the counter reaches a predetermined low threshold value. Each time this occurs, a new counter value is re-calculated based again upon the current level of free memory, and the average size of recent memory requests.

On FIG. 3, a system memory request is made at a function block 210, after which the current value of the Request Counter is checked at a function block 212. In the example of FIG. 3, the low threshold is equal to zero (0), and a decision block 214 checks to see whether or not the counter has decremented to the value of zero. If the answer is NO, the logic flow is directed to a function block 216 that services the memory request. After the memory request has been serviced, a function block 218 decrements the numeric value of the Request Counter, and a function block 220 will return from this subroutine.

If the result at decision block 214 was YES, then the logic flow is directed to a function block 222 that checks the actual free memory size in the printer's memory system. A "Low Water Mark" is chosen (as a low threshold value) in advance by the system designer of the printer, and a decision block 224 determines whether or not the actual free memory size is less than this Low Water Mark. If the answer is NO, the logic flow is directed to a function block 230 that resets the Request Counter to a numeric value that is based upon the average memory request size and the amount of memory that is currently free. The logic flow then travels to function block 216 where the memory request is serviced.

In the circumstance where the print engine is able to keep up with the processing of incoming print data, the result at decision block may always be NO, and no compression of image data need take place. In that event, since function block 218 decrements the value of the Request Counter each time an uncompressed block is stored in memory (at function block 216), then this Request Counter must later be incremented each time one of the uncompressed image data blocks is retrieved from RAM 52 and communicated to the print engine 36. In this manner, the count value of the Request Counter may never reach zero (0) during the processing and printing of a relatively short and simple print job.

Figure 5:
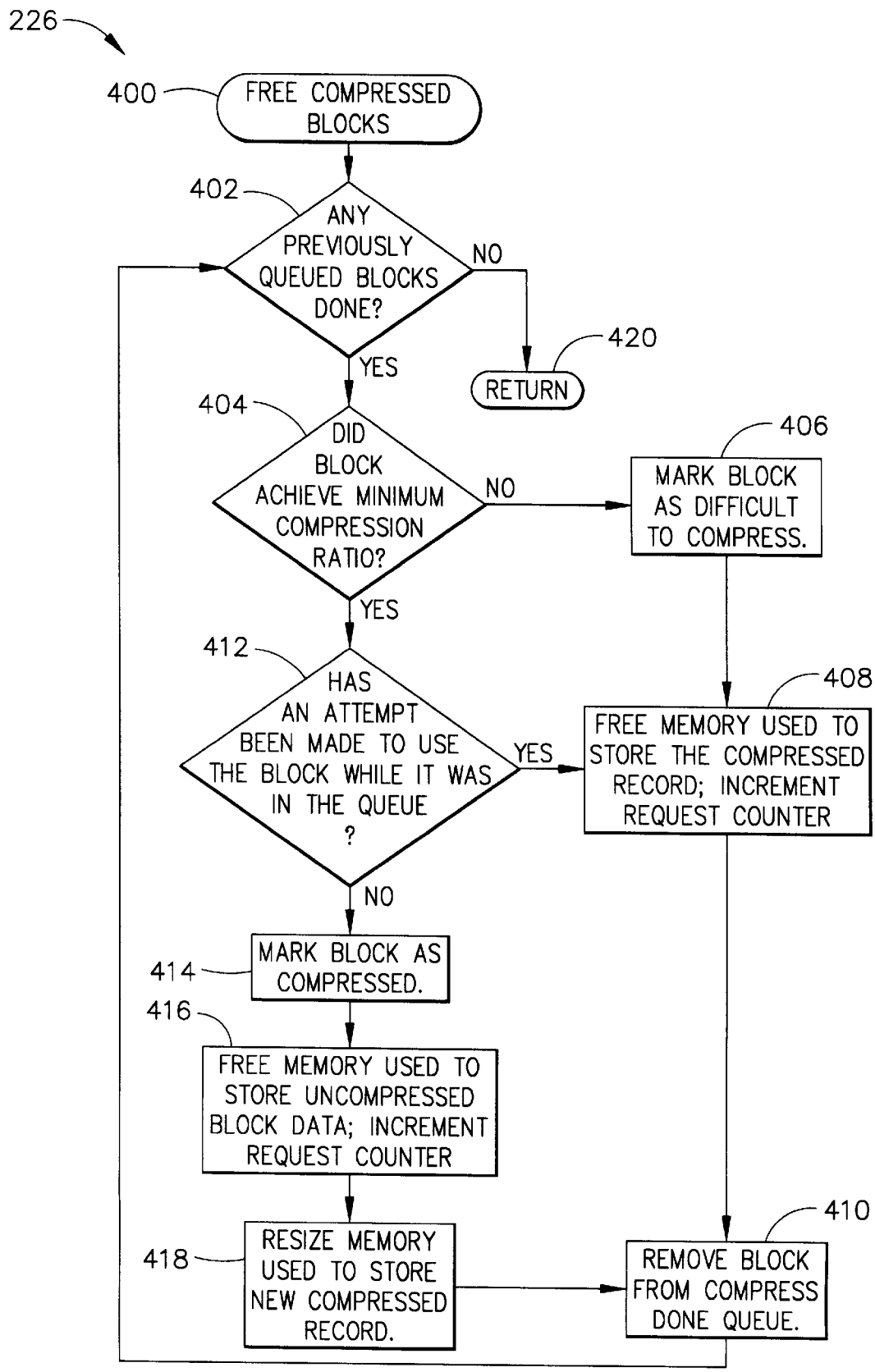
FIG. 5 is a flow chart depicting the logic operational steps to perform a "Freeing Compressed Blocks" routine, as used in the printer of FIG. 1.

If the result at decision block 224 was YES, then a function block 226 performs a "Free Compressed Block" routine, which performs functions that are detailed in FIG. 5 herein. This routine checks blocks that have been recently compressed, and frees up the memory space that was previously allocated for the uncompressed data block.

Figure 4A:
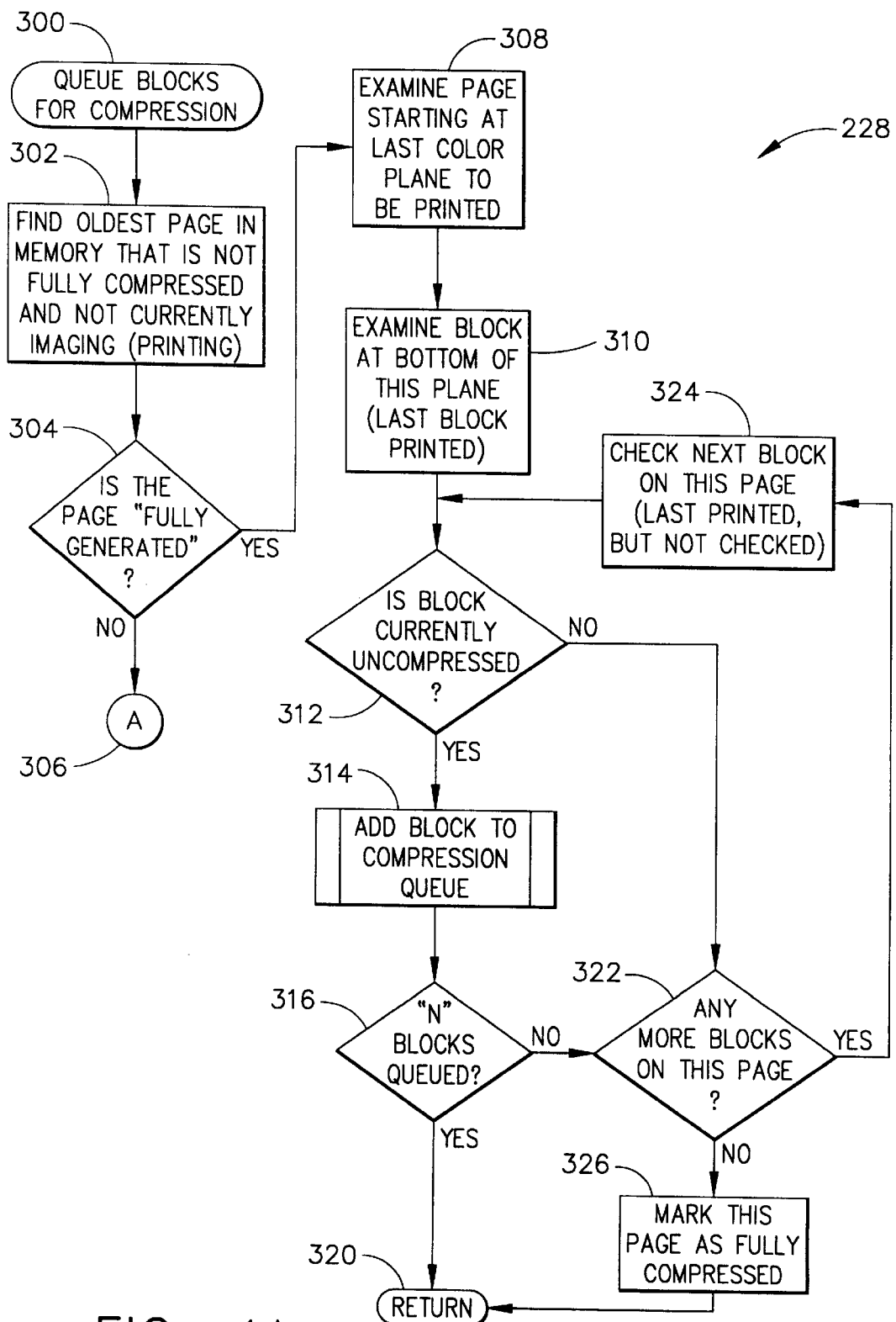
FIGS. 4A and 4B represent a flow chart depicting the logic operational steps to perform a "Queue Blocks for Compression" routine, as used in the printer of FIG. 1.
Figure 4B:
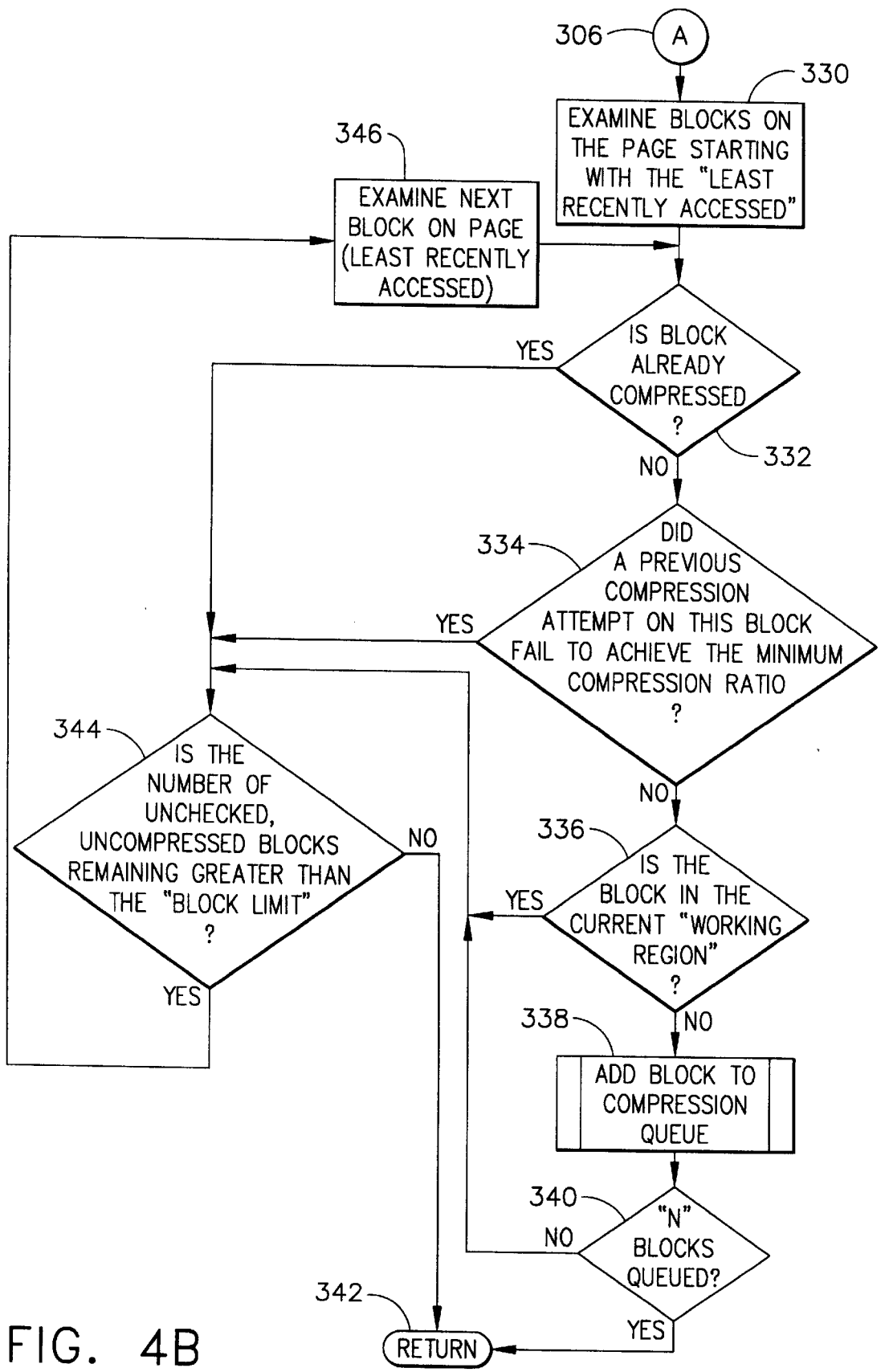

A function block 228 now runs a "Queue Blocks for Compression" routine, which functions are detailed in FIGS. 4A and 4B herein. After this occurs, the Request Counter will be reset at function block 230 and the memory request will be serviced at function block 216.

It is preferred that blocks be submitted in groups to the hardware compression device 60 to further improve the printer's performance and to reduce memory fragmentation. A fixed number of blocks for a group (i.e., the "group block size") is chosen for each particular printing system, which typically would be hardware specific. When the printer's control software is searching for blocks of data that can be submitted to the compression queue, it will also search for this fixed number of blocks specified by the group block size. In most cases, it will find the appropriate number of blocks, submit them for compression, and then release control back to the printing system. More blocks will not be submitted unless the control software determines that the amount of available memory is still below the "Low Water Mark."

When decision block 224 realizes that the Low Water Mark has been reached, blocks of data in the printer's memory (i.e., RAM 52) must be chosen which can be compressed in the background so that memory can later be made available for other uses. Once a group of blocks (according to the group block size) are chosen, the blocks are submitted to a BIOS driver layer, which is part of the overall control code (i.e., software and/or firmware) of the printer. Pages are stored in a linked list from the currently building page to the currently printing page, and data blocks on each page are stored in a linked list from the least recently accessed block, to the most recently accessed block. The oldest pages in RAM 52 are first searched for blocks that can be compressed. Unless the "oldest page" 102 is already imaging (i.e., printing), or is already fully compressed, blocks will be chosen from that page for compression. If the page is already "fully generated" then there is no risk that any blocks of data on that page will ever need to be decompressed again to modify the bitmap. These fully generated pages are referred to herein as "Done" pages. The only time blocks on Done pages will ever need to be decompressed again is just before the pages are printed. Further details of these logic operations are provided in the flow charts herein.

At the lowest level within the control code of the printer's software, the BIOS driver layer manages a set of priority based queues for data that will be compressed or decompressed. The higher levels of the software control code will submit blocks of data to the BIOS layer for either compression or decompression, and when blocks are submitted a priority level is specified for each block. The BIOS code manages the submission of blocks to the compression and decompression devices 60 and 70, and attempts to always keep this hardware busy while making sure that higher priority blocks are submitted to the compression device 60 and decompression device 70 before lower priority blocks.

When "done" pages are found in RAM 52, blocks from a Done page are chosen according to their physical location on the page. Blocks are generally picked first from the last color plane that will be printed for a page. The control software will search for blocks to compress in this page until all blocks on all planes are compressed (i.e., or queued for compression) or until the page starts to be imaged by the print engine 36. Once a Done page can no longer be used for selection of blocks, the next older page in the system is considered. If there are no Done pages in RAM 52, then blocks on the current or "active" page must be considered for compression. Since it is possible that blocks chosen for compression might later need to be accessed again for modification of the bitmap, it is important to select these blocks carefully to avoid having blocks being repeatedly compressed and decompressed. The overhead associated with such thrashing can cause an overall negative effect on system performance.

The least recently accessed blocks for each plane of the active page are considered first for queuing to the compressor device 60. In typical print jobs, the last accessed block is likely to never be used again. However, blocks that do not need any of the "exclusion factors" described below will be queued to the BIOS layer for compression. In the preferred embodiment, these exclusion factors are determined by decision blocks 334, 336, and 344, on FIG. 4B, as described below.

On FIGS. 4A and 4B, the "Queue Blocks for Compression" routine 228 is described in greater detail, beginning at a step 300 on FIG. 4A. At a function block 302 the printer looks for the "oldest page" currently residing in memory (i.e., RAM 52) that is not fully compressed and is not currently imaging (which on a color printer, means that it is currently not printing). A decision block 304 now determines whether or not the page chosen at function block 302 is "fully generated." If the answer is NO, the logic flow is directed to the letter "A" at 306 on FIG. 4A, which further directs the logic flow over to a similar letter "A" on FIG. 4B.

If the result at decision block 304 is YES, a function block 308 examines this chosen page starting at the last color plane that will be printed, which will be hardware specific for a particular printer. At a function block 310, the image blocks on the bottom of this plane are examined (i.e., the printer is looking for the last blocks that will be printed for this color plane). At a decision block 312, it is determined whether or not the selected block is currently uncompressed. If the answer is YES, the logic flow is directed to a function block 314 which represents a routine that adds a block to the compression queue, and which is more fully described on FIG. 6.

Once the routine at 314 adds a block to the compression queue, a decision block 316 determines whether or not there are "N" blocks presently in the compression queue. If the answer is YES, then the Queue Blocks for Compression routine 228 is completed, and the logic flows returns at 320.

If the decision block 314 determines that the image block chosen at function block 310 is not currently uncompressed (i.e., meaning that it currently is compressed), then the logic flow travels to a decision block 322. If decision block 316 determines that there are not "N" blocks presently queued, then the logic flow is also directed to decision block 322. Decision block 322 determines whether or not there are any more blocks on this page that have not been compressed. If the answer is NO, the logic flow is directed to a function block 326 which marks this page as being "fully compressed." Then the routine is completed and returns at 320. If the result is YES at decision block 322, the logic flow is directed to a function block 324 that checks the next block on this page, for example, the next block from the bottom of the page. To "check" this block, the logic flow is directed back to decision block 312 where it is determined whether or not the block is currently uncompressed.

If the result at decision block 304 was NO, then the chosen page at function block 302 is not "fully generated," and special care must be taken before sending a block from such a page off to be compressed. On FIG. 4B, starting at 306 at the letter "A", a function block 330 examines image blocks on this page starting with the blocks that have been least recently accessed. The block selected is analyzed at a decision block 322 which determines whether or not this image block has already been compressed. If the answer is YES, then the logic flow is directed to a decision block 344 which determines whether or not the number of unchecked, uncompressed blocks remaining are greater than a "block limit." This "block limit" represents the minimum number of blocks that are to be left uncompressed for each color plane, and this number is generally equal to the number of blocks it takes to fill the width of a page (i.e., to complete a strip or swath for a plane of the page). This minimum number may be fine-tuned for a particular printing system. The control software ensures that once any plane is down to this number of uncompressed blocks, the remaining blocks will be excluded from submission to the compression hardware device 60.

If decision block 344 determines that the number of unchecked and uncompressed blocks remaining for this plane is not greater than the block limit, then the Queue Blocks for Compression routine is completed and returns at 342. On the other hand, if the result at decision block 344 is YES, then the logic flow is directed to a function block 346 which examines the next block on the page that has already been determined as the "least recently accessed" page. This next block is tested at decision block 332 to determine if it is already compressed.

If the result at decision block 332 was NO, then a decision block 334 determines whether or not a previous compression attempt on this image block failed to achieve the minimum compression ratio. When blocks are submitted to the BIOS layer for compression, a minimum allowable compression ratio preferably must be specified. This allows the control software to require a higher compression ratio when memory is low so as to more effectively reduce overall memory fragmentation. In the preferred embodiment, blocks submitted for active pages (e.g., such as the page 150 on FIG. 2, also denoted as a "working page"), are required to compress to a ratio of 2:1 or better. If a block does not meet this compression ratio, it is tagged, and no further attempt is made to compress that block again unless the free memory pool becomes completely empty.

In view of the above paragraph, if decision block 334 determines that a particular block failed to achieve the minimum compression ratio (by inspecting a flag bit attached with the data for that block), then the logic flow is directed out the YES output and to decision block 344 which checks to see if the number of unchecked, uncompressed blocks that are remaining are greater than the block limit. If the answer is YES, then the logic flow is directed back to function block 346, which examines the next block on the page (thereby completing a loop in the situation where an uncompressed block is essentially bypassed by this portion of the operating software because it was not able to compress to at least a 2:1 ratio).

If decision block 334 determines that there was no previous compression attempt on a particular block that failed to achieve a minimum compression ratio, the logic flow travels out the NO output to a decision block 336 which inspects the image block to determine if it is within the current "working region" of the interpreter. There are page description language commands and codes that operate on a bitmap image for a page or a color plane that may affect large rectangular regions of the physical page or plane, and the interpreter will define which blocks are affected when the interpreter is processing image elements from several different blocks in one operation. When this occurs, the printer will "tag" blocks in this region of that page or plane to remain uncompressed while these blocks are being used by the interpreter. The decision block 336 examines the image blocks for this special tag (i.e., a flag bit associated with this block), and avoids submitting any such blocks for compression at this time. The result of finding a block in the current working region is that the logic flow travels out the YES output of decision block 336, then to decision block 344 which will likely send the logic flow back to function block 346 to examine the next block on the page.

If decision block 336 determines that the current image block is not in the current working region of this page or plane, then the logic flow is directed to a function block 338 which calls the routine to add the block to the compression queue. This routine is more fully described hereinbelow, relating to FIG. 6.

A decision block 340 now determines whether or not there are "N" blocks already queued, and if the answer is YES, this Queue Blocks for Compression routine is completed, and returns at 342. If there are not "N" blocks queued, then the logic flow is directed out the NO output of decision block 340 and arrives at the decision block 344.

The control software is designed to free memory space that is associated with blocks that have already been compressed. When the hardware device 60 finishes compressing a block, an entry is placed in a "Compression Done Queue." The control software periodically searches this queue for information about blocks that have been compressed, although the queue is only searched when the amount of free memory is less than the low water mark.

While a block is in the Compression Done Queue, it exists temporarily in both a compressed and decompressed form. Depending on the information in the queue entry, this block will be handled in one of two ways. If the block did not compress at the requested compression ratio, or if the block was needed in its uncompressed form before the uncompressed data was released, then the block must revert back to its form as an uncompressed block. The portion of memory that was allocated to store the compressed record is freed, and the block is tagged if it was found to have an insufficient compression ratio. On the other hand, if the block compressed successfully, then the memory that contains the uncompressed data is freed, and the block is marked as being "compressed." The memory that holds the compressed record is now re-sized so that it only uses a minimum amount of memory for these purposes.

On FIG. 5, the Freeing Compressed Blocks routine 226 is described in greater detailed. Starting at a step 400, the logic flow is directed to a decision block 402 which determines if any of the previously queued blocks are in the Compression Done Queue. If the answer is NO, then this routine is completed and returns at 420.

If the answer is YES at decision block 402, a decision block 404 determines if a particular image block achieved the minimum compression ratio. If the answer is NO, then a function block 406 marks the block as being "difficult to compress." When this occurs, a function block 408 frees the memory space that was used to store the compressed record of this image block, since the printer is not going to save this poorly compressed block. In addition, the Request Counter is incremented. After that occurs, a function block 410 removes this image block from the Compression Done Queue, which means that this block will remain saved in the printer's memory (i.e., RAM 52) as an uncompressed bitmap image.

If the result at decision block 404 was YES, then the logic flow is directed to a decision block 412 which determines whether or not an attempt has been made to use the block while it was in the queue. This can occur if the block is accessed by the interpreter while the block is in the queue. If the answer is YES, then the logic flow is directed to function block 408 which frees the memory used to store the compressed record for this image block at which time function block 410 removes the image block from the Compression Done Queue. Again, this image block will not be stored in its compressed state, but will, at least for now, remain stored in its uncompressed state.

If the result at decision block 412 was NO, then a function block 414 will mark the block as "compressed," a function block 416 will free the memory that was used to store the uncompressed block data, the Request Counter is now incremented, and a function block 418 will resize the memory that was used to store the new compressed record for this block. Function block 410 now removes the block from the Compression Done Queue, and the logic flow is directed back to decision block 402.

Figure 6:
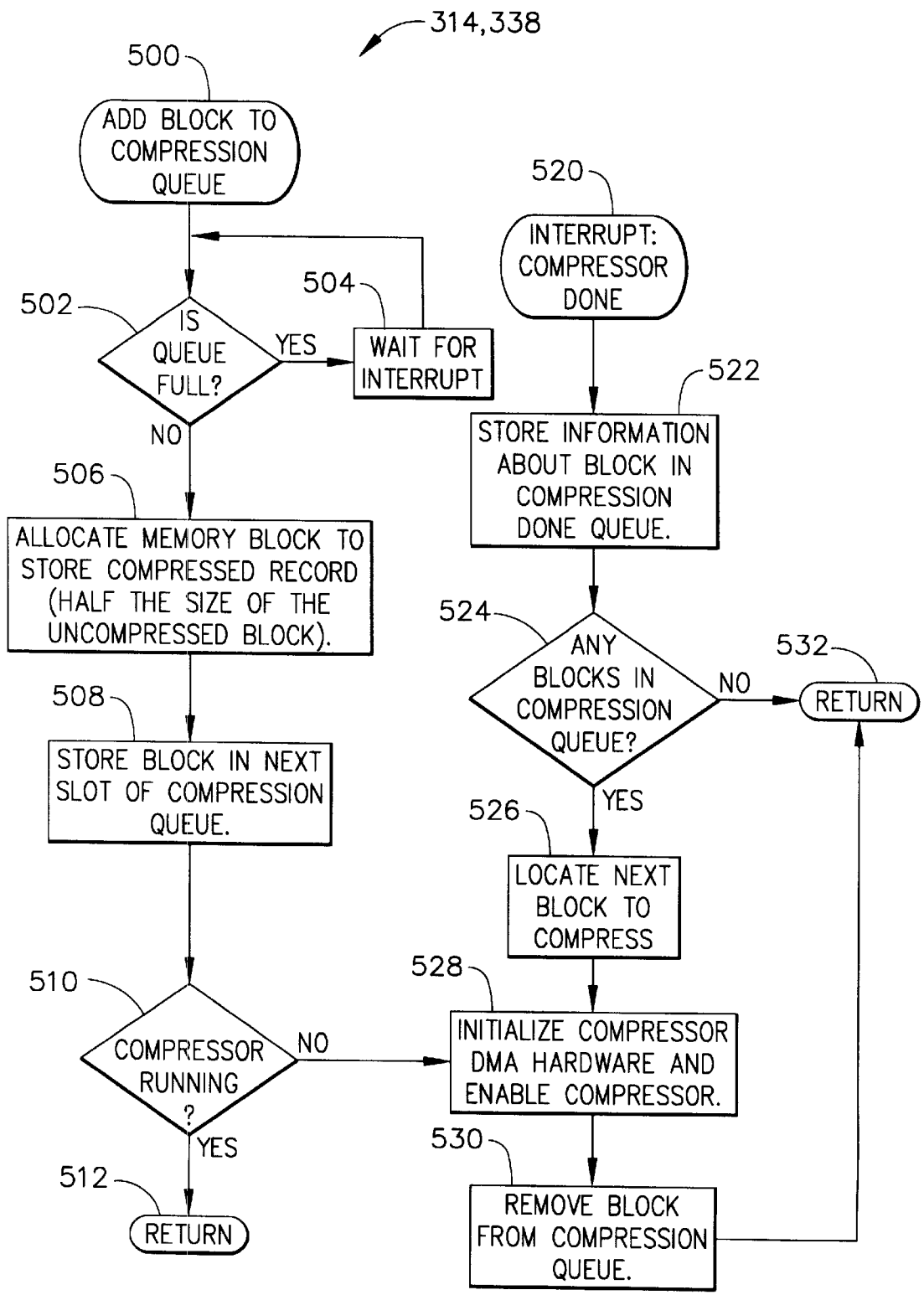
FIG. 6 is a flow chart depicting the logic operational steps to perform a "Queuing Blocks for Compressing" routine, as used in the printer of FIG. 1.

FIG. 6 is a flow chart for a "Queueing Blocks for Compression" routine, which was previously seen as function block 314 on FIG. 4A, and function block 338 on FIG. 4B. Starting at a step 500, a decision block 502 determines whether or not the Block Compression Queue is full. If the answer is YES, then the logic flow is directed to a function block 504 which waits for an interrupt, before looping the logic flow back to decision block 502. It will be understood that the microprocessor system for printer 10 is a multitasking system, and the microprocessor does not actually remain completely idle while waiting for this interrupt at function block 504.

If the Block Compression Queue is not full, then the logic flow travels out the NO output from decision block 502 to a function block 506 which allocates a portion of memory to store the compressed record for an image block. Assuming that a 2:1 ratio is the minimum compression ratio for this printer, then the memory allocated to store this compressed block can be half the size of the memory needed to store the uncompressed record for this block, so the compressed record should be able to fit within a 4 Kbyte area of memory for an image block that was sized at 128 lines×512 columns. A function block 508 now stores the image block in the next slot of the compression queue.

A decision block 510 now determines whether or not the compression device 60 is currently running. If the answer is YES, then this part of the Queueing Blocks for Compression routine is complete, and returns at 512. If the answer is NO, then the logic flow is directed to a function block 528, which will be discussed below.

When the compression device 60 completes its compression operation for a particular block of print data, an interrupt is generated at a step 520. A function block 522 now stores information about the block that was just compressed in the Compression Done Queue, and a decision block 524 determines whether or not any blocks remain in the compression queue. If the answer is NO, then this portion of the Queueing Blocks for Compression routine is complete, and returns at 532.

If the result at decision block at 524 was YES, then a function block 526 locates the next block to be compressed in the Block Compression Queue, keeping in mind that blocks to be compressed can have a priority level associated with each block. The logic flow is now directed to a function block 528 which initializes the compressor DMA (Direct Memory Access) hardware and enables the compression device 60. As the system BIOS transfers the uncompressed data associated with this block into the compression device 60, this block is removed from the Block Compression Queue at a function block 530. This routine now returns at 532.

If printer 10 actually runs out of memory so that it cannot perform any further useful tasks, then some of its image data must be compressed under all circumstances to enable the printer to continue performing useful functions. Even with the hardware compression device 60 running in the background of the microprocessor 14 for printer 10, it is nevertheless possible that all memory will be exhausted and at the same time no further blocks can be found for compression that meet the criteria described above. One of these criterion is whether or not the block compressed to a 2:1 ratio or better. In the condition where memory has been completely exhausted, the operating software for the printer will temporarily revert back to the "straightforward method" of compressing any available block until just enough memory is available to complete the current operation of the printer. As related above, this mode only occurs when an extremely complex page is being printed in low memory or when the processing of pages is far ahead of the print engine.

Figure 7:
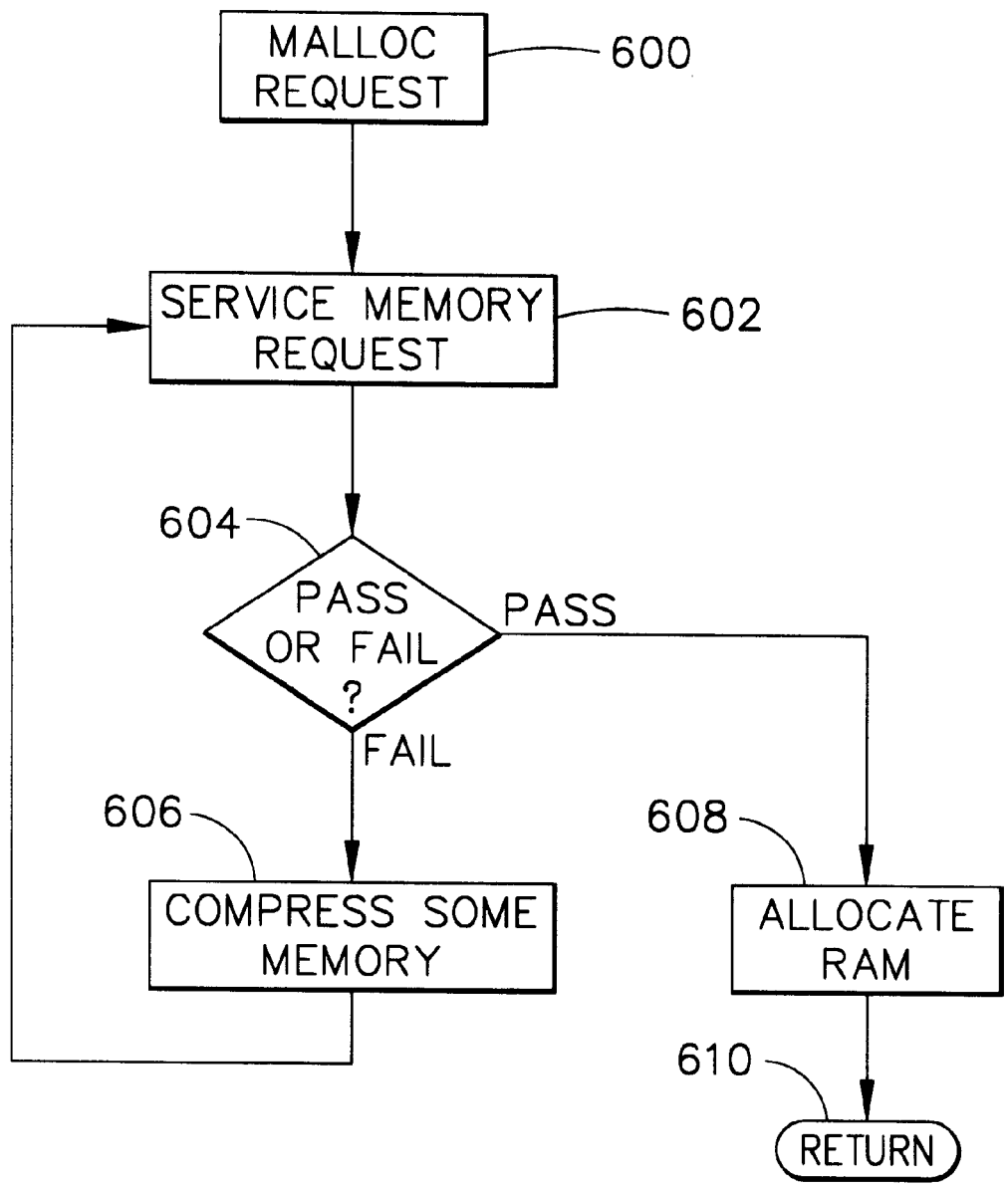
FIG. 7 is a flow chart depicting the logic operational steps to perform a "Straightforward Compression" routine, as used in the printer of FIG. 1.

On FIG. 7, a memory allocation request occurs at a step 600, and a function block 602 now services that memory request. The control software for the printer may revert to a method of compression known as "compressed on demand" when the largest portion of contiguous free memory is smaller than the uncompressed bitmap size for a single image block. A decision block 604 determines whether or not a sufficient amount of contiguous free memory is available for this purpose. If the amount of memory available is less than the size of an uncompressed bitmap block, then the logic flow is directed out the FAIL output to a function block 606 which compresses some further memory. The logic flow is now directed back to function block 602 to again service the memory request.

On the other hand, if there is sufficient contiguous free memory, the logic flow travels out the PASS output of decision block 604 to a function block 608 which allocates the appropriate amount of memory space to hold an uncompressed bitmap block. The logic flow then returns at a step 610. As soon as the free memory size grows to exceed this uncompressed bitmap block size, the control software will resume submitting such blocks for compression.

The size of the low water mark (i.e., the value of this low threshold) is adjusted based upon several factors, including the amount of memory in the printing system, the printer technology, the speed of the compression device 60, and other intrinsic factors. In general, the low water mark is a fixed constant for a particular hardware configuration. However, if the printer supports multiple print modes or print resolutions, then the value of the low water mark may be different for each such print mode. The initial value for the low water mark will typically be chosen by extensive testing at different levels by the printer's manufacturer. The only requirement is that the low water mark be larger than the bitmap block size, and less than the total amount of memory installed in the printer. For most printing systems, the low water mark is likely to be set at a value between 5% and 20% of a total amount of system memory in the printer 10.

It will be understood that the principles of the present invention can be used to advantage in many types of imaging systems other than laser printers to improve system throughput. The smaller the quantity of RAM provided in a printing or imaging system, the more pronounced the beneficial effects of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In an image processing system having a memory circuit for storing information, a data compression circuit, an image output device, and a processing circuit that controls the routing of data between said memory circuit, data compression circuit, and image output device; a method for selectively compressing image data, said method comprising the steps of:

(a) selecting a predetermined threshold value of memory size;

(b) dividing a page of image data into a plurality of blocks;

(c) initiating processing of each of said plurality of blocks of image data;

(d) comparing the actual size of free memory space within said memory circuit with respect to said predetermined threshold value, and:

(i) if said actual size of free memory space is greater than said predetermined threshold value, temporarily storing at least one of said plurality of blocks of image data in said memory circuit; and (ii) if said actual size of free memory space is not greater than said predetermined threshold value, compressing at least one of said plurality of blocks of image data via said data compression circuit, and temporarily storing said at least one of said plurality of blocks of compressed image data in said memory circuit, while virtually simultaneously continuing processing of said plurality of blocks of image data using available free memory space of said memory circuit.

2. The method as recited in claim 1, further comprising the step of selecting said blocks for compression according to a priority, wherein the blocks selected first are the "oldest" blocks currently contained in said memory circuit.

3. The method as recited in claim 1, further comprising the steps of excluding certain of said blocks from being compressed, including those of said blocks that:

(a) fail to compress to a desired compression ratio;

(b) cause the number of uncompressed blocks to fall below a predetermined minimum number;

(c) fall within an active region of a page currently being processed.

4. In an image processing system having a memory circuit for storing information, a data compression circuit, an image output device, and a processing circuit that controls the routing of data between said memory circuit, data compression circuit, and image output device; a method for selectively compressing image data, said method comprising the steps of:

(a) setting a Request Counter to a predetermined value, and selecting a first predetermined threshold value and a second predetermined threshold value;

(b) dividing a page of image data into a plurality of blocks;

(c) initiating processing of each of said plurality of blocks of image data;

(d) said Request Counter's value is not greater than said first threshold value, comparing the actual size of free memory space within said memory circuit with respect to said second threshold value, and:

(i) said actual size of free memory space is greater than said second threshold value, temporarily storing at least one of said plurality of blocks of image data in said memory circuit;

(ii) if said actual size of free memory space is not greater than said second threshold value, compressing at least one of said plurality of blocks of image data via said data compression circuit, and temporarily storing said at least one of said plurality of blocks of compressed image data in said memory circuit, virtually simultaneously continuing processing of said plurality of blocks of image data using available free memory space of said memory circuit; and (e) if said Request Counter's value is greater than said first threshold value, decreasing said Request Counter's value upon each occurrence of storing one of said plurality of blocks.

5. The method as recited in claim 4, further comprising the steps of:

(a) successively retrieving each of said plurality of blocks of uncompressed image data in said memory circuit and communicating said blocks to said image output device, and increasing said Request Counter's value upon each occurrence of retrieving one of said plurality of blocks; and (b) retrieving and decompressing each of said plurality of blocks of compressed image data in said memory circuit, via a data decompression circuit, and communicating said blocks to said image output device, virtually simultaneously continuing processing of said plurality of blocks of image data using available free memory space of said memory circuit.

6. The method as recited in claim 4, further comprising the step of selecting said blocks for compression according to a priority, wherein the blocks selected first are the "oldest" blocks currently contained in said memory circuit.

7. The method as recited in claim 4, wherein the step of setting said Request Counter to a predetermined value is determined by the manufacturer of said image processing system for a particular print resolution, and said predetermined value is related to the number or uncompressed image data blocks that can be stored in the image processing system's memory circuit before requiring the initiation of compressing said image data blocks.

8. The method as recited in claim 5, further comprising the step of selecting said blocks for decompression according to a priority, wherein the blocks selected first are blocks that are to be displayed next, and blocks selected second are blocks needed by an interpreter for further image processing.

9. The method as recited in claim 4, further comprising the steps of excluding certain of said blocks from being compressed, including those of said blocks that:
   (a) fail to compress to a desired compression ratio;
   (b) cause the number of uncompressed blocks to fall below a predetermined minimum number;
   (c) fall within an active region of a page currently being processed.

10. In a printing system having a memory circuit for storing information, a data compression circuit, a print engine, and a processing circuit that controls the routing of data between said memory circuit, data compression circuit, and print engine; a method for selectively compressing image data, said method comprising the steps of:
   (a) selecting a predetermined threshold value of memory size;
   (b) dividing a page of image data into a plurality of blocks;
   (c) initiating processing of each of said plurality of blocks of image data;
   (d) comparing the actual size of free memory space within said memory circuit with respect to said predetermined threshold value, and:
      (i) if said actual size of free memory space is greater than said predetermined threshold value, temporarily storing at least one of said plurality of blocks of image data in said memory circuit; and
      (ii) if said actual size of free memory space is not greater than said predetermined threshold value, compressing at least one of said plurality of blocks of image data via said data compression circuit, and temporarily storing said at least one of said plurality of blocks of compressed image data in said memory circuit, while virtually simultaneously continuing processing of said plurality of blocks of image data using available free memory space of said memory circuit.

11. The method as recited in claim 10, further comprising the step of selecting said blocks for compression according to a priority, wherein the blocks selected first are the "oldest" blocks currently contained in said memory circuit.

12. The method as recited in claim 10, further comprising the steps of excluding certain of said blocks from being compressed, including those of said blocks that:
   (a) fail to compress to a desired compression ratio;
   (b) cause the number of uncompressed blocks to fall below a predetermined minimum number;
   (c) fall within an active region of a page currently being processed.

13. In a printing system having a memory circuit for storing information, a data compression circuit, a print engine, and a processing circuit that controls the routing of data between said memory circuit, data compression circuit, and print engine; a method for selectively compressing image data, said method comprising the steps of:
   (a) setting a Request Counter to a predetermined value, and selecting a first predetermined threshold value and a second predetermined threshold value;
   (b) dividing a page of image data into a plurality of blocks;
   (c) initiating processing of each of said plurality of blocks of image data;
   (d) said Request Counter's value is not greater than said first threshold value, comparing the actual size of free memory space within said memory circuit with respect to said second threshold value, and:
      (i) said actual size of free memory space is greater than said second threshold value, temporarily storing at least one of said plurality of blocks of image data in said memory circuit;
      (ii) if said actual size of free memory space is not greater than said second threshold value, compressing at least one of said plurality of blocks of image data via said data compression circuit, and temporarily storing said at least one of said plurality of blocks of compressed image data in said memory circuit,
      virtually simultaneously continuing processing of said plurality of blocks of image data using available free memory space of said memory circuit; and
   (e) if said Request Counter's value is greater than said first threshold value, decreasing said Request Counter's value upon each occurrence of storing one of said plurality of blocks.

14. The method as recited in claim 13, further comprising the steps of:
   (a) successively retrieving each of said plurality of blocks of uncompressed image data in said memory circuit and communicating said blocks to said print engine, and increasing said Request Counter's value upon each occurrence of retrieving one of said plurality of blocks; and
   (b) retrieving and decompressing each of said plurality of blocks of compressed image data in said memory circuit, via a data decompression circuit, and communicating said blocks to said print engine,
      virtually simultaneously continuing processing of said plurality of blocks of image data using available free memory space of said memory circuit.

15. The method as recited in claim 13, further comprising the step of selecting said blocks for compression according to a priority, wherein the blocks selected first are the "oldest" blocks currently contained in said memory circuit.

16. The method as recited in claim 13, wherein the step of setting said Request Counter to a predetermined value is determined by the manufacturer of said printing system for a particular print resolution, and said predetermined value is related to the number or uncompressed image data blocks that can be stored in the printing system's memory circuit before requiring the initiation of compressing said image data blocks.

17. The method as recited in claim 14, further comprising the step of selecting said blocks for decompression according to a priority, wherein the blocks selected first are blocks that are to be displayed next, and blocks selected second are blocks needed by an interpreter for further image processing.

18. The method as recited in claim 13, further comprising the steps of excluding certain of said blocks from being compressed, including those of said blocks that:

(a) fail to compress to a desired compression ratio;

(b) cause the number of uncompressed blocks to fall below a predetermined minimum number;

(c) fall within an active region of a page currently being processed.

19. The method as recited in claim 13, wherein the current value of said Request Counter is related to the amount of actual free memory available in said memory circuit.

20. The method as recited in claim 13, further comprising the step of avoiding thrashing of said blocks that are part of a currently active page.

21. The method as recited in claim 13, further comprising the step of using a straightforward method of compressing said blocks of image data only after the actual size of said free memory falls to near-zero.

22. A printing apparatus, comprising:

(a) a memory circuit used for storing image data;

(b) a data compression circuit used for compressing image data;

(c) a processing circuit that is configured to control the flow of data between said memory circuit and said data compression circuit, said processing circuit being configured to divide a page of image data into a plurality of blocks; and to set a predetermined threshold value of memory size;

(d) said processing circuit also being configured to initiate processing of each of said plurality of blocks of image data, and to compare the actual size of free memory space within said memory circuit to said threshold value; wherein if said actual size of free memory space is greater than said threshold value, at least one of said plurality of blocks of image data is stored in said memory circuit, and if said actual size of free memory space is not greater than said threshold value, said processing circuit being further configured to command said data compression circuit to compress at least one of said plurality of blocks of image data while said processing circuit continues to process others of said plurality of blocks of image data using available free memory space of said memory circuit; and (e) said data compression circuit being configured to perform its compression operation independently of said processing circuit;

the effect of which is to have a compression function and an image processing function occurring simultaneously within said printing apparatus.

23. The printing apparatus as recited in claim 22, wherein, after said data compression circuit has completed its compression cycle for one of said blocks of image data, said processing circuit is further configured to store at least one of said plurality of blocks of compressed image data in said memory circuit.

24. The printing apparatus as recited in claim 22, further comprising a DMA controller that interfaces said compression circuit with said memory circuit.

25. The printing apparatus as recited in claim 22, further comprising a decompression circuit that is configured to receive at least one block of compressed image data that is retrieved from said memory circuit, perform a decompression operation on that block, then transfer the resultant decompressed block of image data back to said memory circuit.

26. A printing apparatus, comprising:

(a) a memory circuit used for storing image data;

(b) a data compression circuit used for compressing image data;

(c) a processing circuit that is configured to control the flow of data between said memory circuit and said data compression circuit, said processing circuit being configured to divide a page of image data into a plurality of blocks; and to set a Request Counter to a predetermined value, to set a first predetermined threshold value, and to set a second predetermined threshold value;

(d) said processing circuit also being configured to initiate processing of each of said plurality of blocks of image data, and if said Request Counter's value is not greater than said first threshold value, to compare the actual size of free memory space within said memory circuit to said second threshold value; wherein if said actual size of free memory space is greater than said second threshold value, at least one of said plurality of blocks of image data is stored in said memory circuit, and if said actual size of free memory space is not greater than said second threshold value, said processing circuit being further configured to command said data compression circuit to compress at least one of said plurality of blocks of image data while said processing circuit continues to process others of said plurality of blocks of image data using available free memory space of said memory circuit; and (e) said data compression circuit being configured to perform its compression operation independently of said processing circuit;

the effect of which is to have a compression function and an image processing function occurring simultaneously within said printing apparatus.

27. The printing apparatus as recited in claim 26, wherein, if said Request Counter's value is greater than said first threshold value, then said processing circuit is further configured to decrease said Request Counter's value, upon each occurrence of storing one of said plurality of blocks in said memory circuit.

28. The printing apparatus as recited in claim 26, wherein, after said data compression circuit has completed its compression cycle for one of said blocks of image data, said processing circuit is further configured to store at least one of said plurality of blocks of compressed image data in said memory circuit.

29. The printing apparatus as recited in claim 26, further comprising a DMA controller that interfaces said compression circuit with said memory circuit.

30. The printing apparatus as recited in claim 26, further comprising a decompression circuit that is configured to receive at least one block of compressed image data that is retrieved from said memory circuit, perform a decompression operation on that block, then transfer the resultant decompressed block of image data back to said memory circuit.

* * * * *

UNITED STATES PATENT AND TRADEMARK OFFICE
CERTIFICATE OF CORRECTION

PATENT NO. : 6,038,033
DATED : March 14, 2000
INVENTOR(S) : Michael Donald Bender, Christopher Mark Songer It is certified that error appears in the above-identified patent and that said Letters Patent is hereby corrected as shown below:

In column 18, line 14, claim 3, after "ratio;" insert -- {or} --.

In column 18, line 16, claim 3, after "number;" insert -- {or} --.

In column 18, line 33, claim 4, after "(d)" insert -- {if} --.

In column 18, line 37, claim 4, after "(i)" insert -- {if} --.

In column 18, line 41, claim 4, after "(ii)" insert -- {else} --.

In column 18, line 47, claim 4, after "circuit," insert -- {while} --.

In column 18, line 52, claim 4, after "(e)" insert -- {else} --.

In column 19, line 2, claim 5, after "device," insert -- {while} --.

In column 19, line 26, claim 9, after "ratio;" insert -- {or} --.

In column 19, line 28, claim 9, after "number;" insert -- {or} --.

In column 20, line 1, claim 12, after "ratio;" insert -- {or} --.

In column 20, line 3, claim 12, after "number;" insert -- {or} --.

In column 20, line 19, claim 13, after "(d)" insert -- {if} --.

In column 20, line 23, claim 13, after "(i)" insert -- {if} --.

UNITED STATES PATENT AND TRADEMARK OFFICE
CERTIFICATE OF CORRECTION

PATENT NO. : 6,038,033
DATED : March 14, 2000
INVENTOR(S) : Michael Donald Bender, Christopher Mark Songer It is certified that error appears in the above-identified patent and that said Letters Patent is hereby corrected as shown below:

In column 20, line 27, claim 13, after "(ii)" insert -- {else} --.

In column 20, line 33, claim 13, after "circuit," insert -- {while} --.

In column 20, line 37, claim 13, after "(e)" insert -- {else} --.

In column 20, line 52, claim 14, after "engine," insert -- {while} --.

In column 21, line 9, claim 18, after "ratio;" insert -- {or} --.

In column 21, line 11, claim 18, after "number;" insert -- {or} --.

Signed and Sealed this

Eighth Day of May, 2001

*Attest:*

NICHOLAS P. GODICI

*Attesting Officer*     *Acting Director of the United States Patent and Trademark Office*